United States Patent [19]

Ohkawa et al.

[11] Patent Number: 4,985,349
[45] Date of Patent: Jan. 15, 1991

[54] INFORMATION STORAGE MEDIUM

[75] Inventors: Kideki Ohkawa, Tokyo; Norio Ozawa, Kawasaki; Motonari Matsubara, Yokohama, all of Japan

[73] Assignee: Kabushiki Kaisha Toshiba, Kawasaki, Japan

[21] Appl. No.: 454,956

[22] Filed: Dec. 22, 1989

[30] Foreign Application Priority Data

Dec. 26, 1988 [JP] Japan .................. 63-325871

[51] Int. Cl.$^5$ .............. G03C 1/492; G03C 1/00; G03C 11/00; B32B 3/02
[52] U.S. Cl. ........................ 430/495; 430/19; 430/346; 430/270; 430/945; 346/135.1; 428/64
[58] Field of Search .............. 430/495, 945, 270, 346, 430/290, 19; 346/135.1

[56] References Cited

U.S. PATENT DOCUMENTS

| | | | |
|---|---|---|---|
| 4,373,004 | 2/1983 | Asano et al. | 428/328 |
| 4,433,340 | 2/1984 | Mashita et al. | 346/135.1 |
| 4,434,429 | 2/1984 | Terao et al. | 346/135.1 |
| 4,461,807 | 7/1984 | Mori et al. | 428/469 |
| 4,499,178 | 2/1985 | Wada et al. | 430/495 |
| 4,565,772 | 1/1986 | Takeoka et al. | 430/320 |

FOREIGN PATENT DOCUMENTS 60-34897 2/1985 Japan .

*Primary Examiner*—Paul R. Michl
*Assistant Examiner*—Ashley I. Pezzner
*Attorney, Agent, or Firm*—Foley & Lardner, Schwartz, Jeffery, Schwaab, Mack, Blumenthal & Evans

[57] ABSTRACT

An information storage medium comprises a substrate and a recording layer formed on the substrate containing Te, Ge, C and H. The recording layer is formed by sputtering, with a Ge-Te alloy being used as a target and with a mixed gas of a noble gas and a hydrocarbon being used as a sputtering gas. The hydrocarbon content in the sputtering gas falls within a range of 3 to 35%. The composition of the target is $Ge_xTe_{100-x}$ (where x is expressed by atomic %, and $5 \leq x \leq 20$).

10 Claims, 4 Drawing Sheets

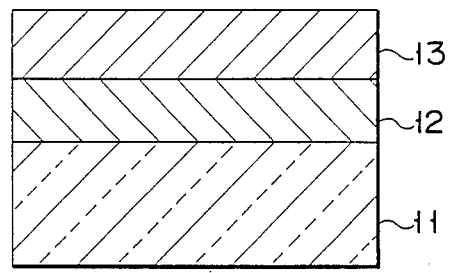
F I G. 1
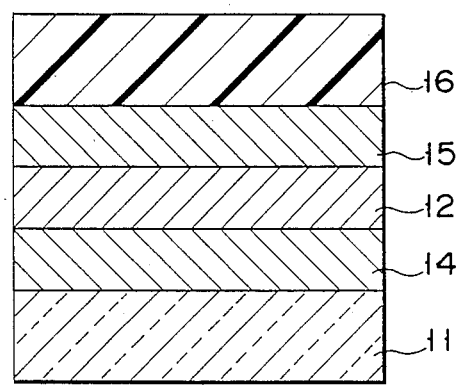
F I G. 2

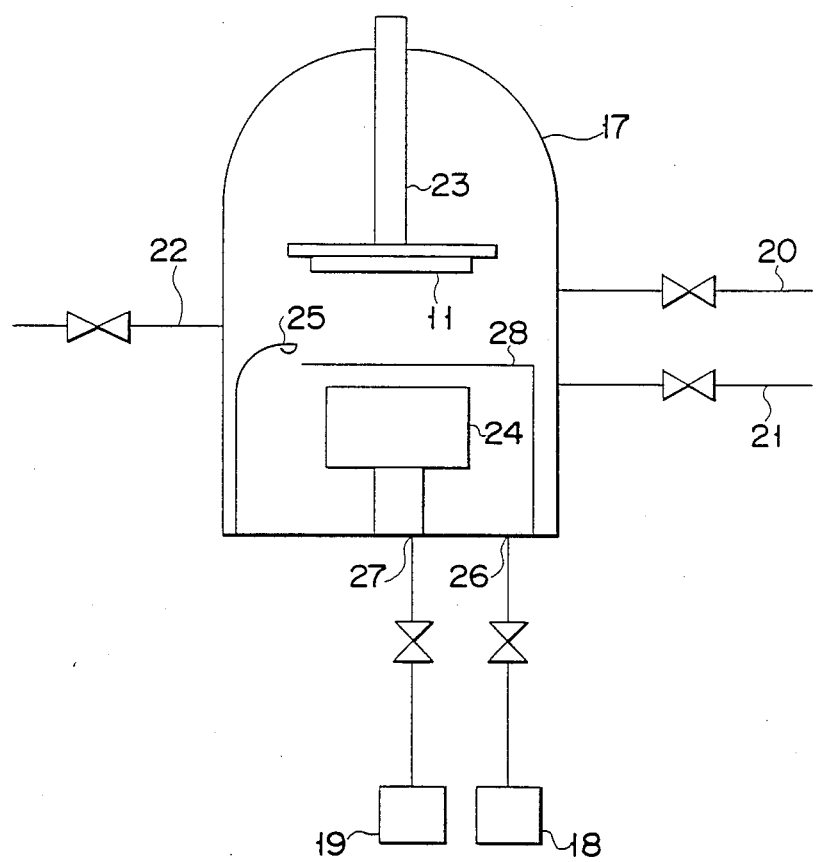
F I G. 3

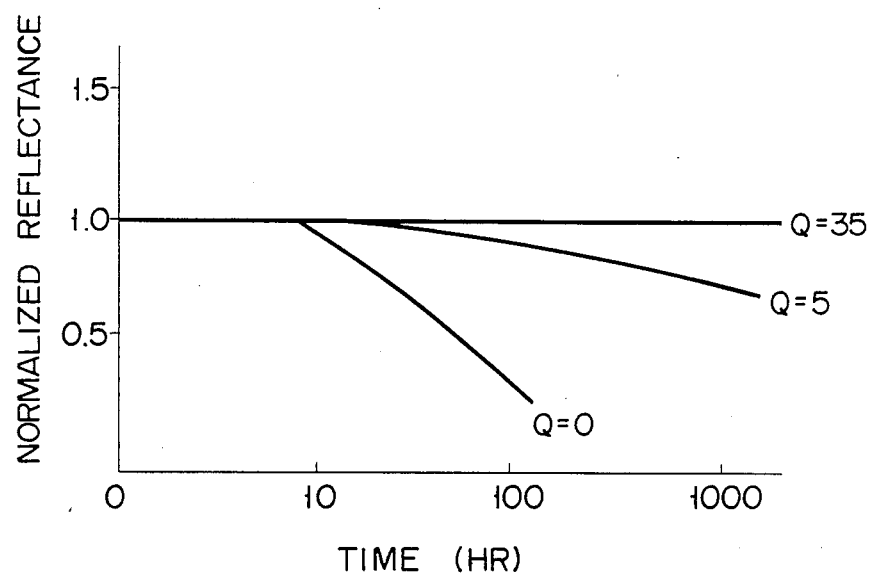
F I G. 6

INFORMATION STORAGE MEDIUM

Background of the Invention

1. Field of the Invention

The present invention relates to an information storage medium wherein data is recorded/erased by changing an atomic arrangement of a recording layer by means of radiation of light.

2. Description of the Related Art

As an information storage medium, for example, an optical disc, wherein data is recorded by means of laser beam radiation and the recorded data is reproduced, there is known one having a recording layer made of tellurium (Te).

However, Te has a low environmental resistance, and is easily oxidized in a high-temperature/high-humidity atmosphere.

To overcome this drawback, there is proposed an information recording medium (U.S. Pat. No. 4,433,340) having a recording layer containing carbon and hydrogen with Te used as a base material (hereinafter, referred to as "Te-C film").

The Te-C film is formed by means of sputtering, with Te used as a target, in an atmosphere containing hydrocarbon such as $CH_4$ or the like. The Te-C film as deposited has an amorphous phase (M. Mashita and N. Yasuda, Proceeding of SPIE, 329, 190 (1982)).

As an information storage medium employing the Te-C film as a recording layer, there is well known a medium of the type wherein holes are formed in the recording layer by means of light beam radiation to record data, and an optical characteristic such as reflectance or transmissivity, which is brought about by the presence/absence of the holes is detected thereby to reproduce the data.

On the other hand, an information storage medium, wherein data can be repeatedly recorded/erased by utilizing a phase transformation caused by radiation of a light beam (e.g., laser beam), has been developed.

When data is recorded in this type of information storage medium, a laser beam is radiated on the entire surface of the recording medium so that the recording layer may be set to in high-crystallinity state (hereinafter, called "crystalline state"). Then, a short and intense pulse beam is radiated on the recording layer, and the beam-irradiated portion of the recording layer is heated and quickly cooled so that portion of the recording layer on which the pulse beam has been radiated may be set to an disordered atomic arrangement state (hereinafter, called "amorphous state"). On the other hand, when the recorded data is erased, a long and weak pulse beam is radiated on the recording layer, and the recording layer is heated and gradually cooled so that the portion of the amorphous state may be set to the crystalline state once again. The crystalline state and the amorphous state have different optical characteristics such as reflectance and transmissivity owing to a change in atomic arrangement. Thus, by detecting the change in optical characteristics, the data can be reproduced.

If the above-mentioned information storage medium having the Te-C film can be used as this "phase transformation type" information storage medium, it is expected that a practically advantageous erasable-type information storage medium can be obtained.

In the Te-C film, however, Te is unstable in its amorphous state. The presence of C (carbon) employed for the purpose of increasing the environmental resistance would intensify the power of a laser beam required for erasing data (i.e., for "crystallization"). As a result, the erasing of data would become difficult.

SUMMARY OF THE INVENTION

The present invention has been devised to solve the above-stated problems, and its object is to provide an information recording medium having a recording layer containing Te as a main component, having an excellent environmental resistance, and allowing practically reliable recording/erasing of data.

An information storage medium according to the present invention comprises a substrate and a recording layer formed on the substrate and containing Te, Ge, C and H, wherein the recording layer is formed by sputtering with a Ge-Te alloy being used as a target and with a mixed gas of a rare gas and a hydrocarbon gas being used as a sputtering gas, the composition of the target is $Ge_xTe_{100-x}$ (where x is expressed by atomic %, and $5 \leq x \leq 20$), and the hydrocarbon content in the sputtering gas falls within a range of 5 to 35%.

In this information storage medium, the Te-Ge alloy contained in the recording layer can be easily set in the amorphous state. Since the hydrocarbon content in the sputtering gas is set in the above-defined range, the recording/erasing laser power can be set to a practically advantageous level, without decreasing the environmental resistance of the medium. Thus, the "phase variable type" information storage medium, allowing practical recording/erasing operations, can be obtained.

BRIEF DESCRIPTION OF THE DRAWINGS

A more complete appreciation of the invention and many of the attendant advantages thereof will be more readily obtained through reference to the following detailed description and accompanying drawings, in which:

FIGS. 1 and 2 are cross-sectional views showing an information recording medium according to an embodiment of the present invention, respectively;

FIG. 3 is view schematically showing a structure of an example of an apparatus for producing a recording layer of the information recording medium according to the present invention:

FIG. 6 is a graph showing a variation in the reflectance of the recording layer with the passage of time.

DETAILED DESCRIPTION OF THE PREFERRED EMBODIMENTS

Figure 4:
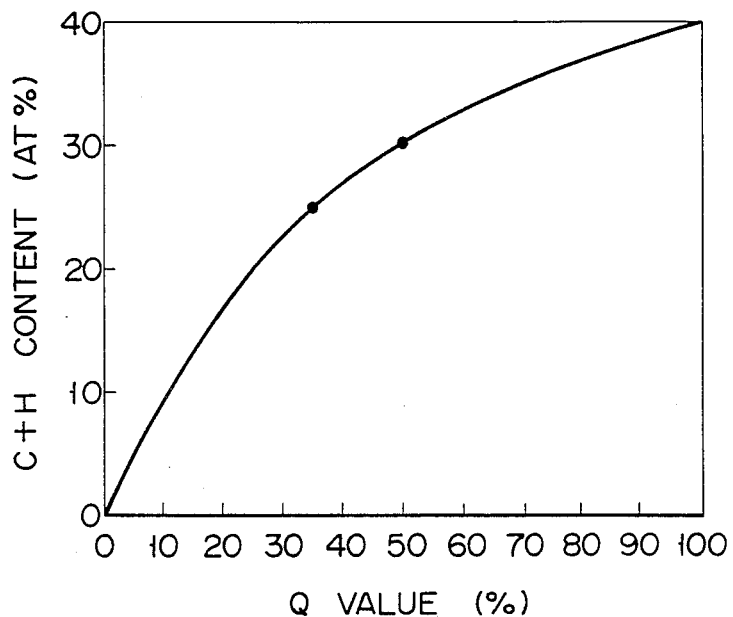
FIG. 4 is a graph showing a relationship between a Q value and a C+H content in the recording layer.

An embodiment of the present invention will now be described with reference to the accompanying drawings.

FIGS. 1 and 2 are cross-sectional views showing an information storage medium according to an embodiment of the present invention, respectively. A substrate 11 is made of a highly stable material. Where a light beam for recording/reproducing data, for example, a laser beam, is radiated from the substrate-side, the substrate 11 is formed of a transparent material through which the light beam is transmitted. For example, the substrate 11 is formed of resin such as polycarbonate (PC), polymethyl methacrylate (PMMA), polyolefin, or epoxy, or glass. Where the light beam is radiated from the recording layer-side, the substrate 11 may be opaque.

The information storage medium of the present invention may be manufactured by superposing a recording layer 12 and a protective layer 13, in this order, on the substrate 11, as shown in FIG. 1, or by superposing a dielectric protective layer 14, a recording layer 12, an inorganic protective layer 15 and an organic protective layer 16, in this order, on the substrate 11, as shown in FIG. 2.

The protective layer 13 is formed of a dielectric material such as $SiO_2$, SiO, AlN or SiN, or an organic material such as an ultraviolet-curing resin. The protective layer 13 protects the recording layer 12 thermally and physically.

The protective layers 14 and 15 are formed of the above-mentioned dielectric material, and prevents the recording layer 12 from being perforated by the radiation of light beam.

The organic protective layer 16 is formed, for example, of an ultraviolet-curing resin, and prevents the recording layer 12 from being damaged.

Though it is desirable to provide these protective layers, these are not indispensable. Only one of the protective layers 14 and 15 may be provided.

The recording layer 12 contains Te, Ge, C and H. The recording layer 12 is formed by sputtering, with an Ge-Te alloy used as a sputtering target, and with a mixed gas of a rare gas and a hydrocarbon gas used as a sputtering gas. The composition of the target is expressed by $Ge_xTe_{100-x}$ (where x is expressed by atomic %, and $5 \leq x \leq 20$). If the hydrocarbon gas content in the sputtering gas in a sputtering step (described later) is Q %, $5 \leq Q \leq 35$.

The relationship between the Q value and the C+H content in the case where methane ($CH_4$) is used as the hydrocarbon is as follows: When Q=35, C+H=25 at.%; when Q=50, C+H =30 at.%; when Q=100, C+H=40 at.%, and when Q=0, C+H=0. This relationship is shown in FIG. 4. The range of Q of $5 \leq Q \leq 35$ corresponds to the range of C+H of $5 \leq C+H \leq 25$ (at.%). When the hydrocarbon gas is introduced into the recording layer, the amount (at.%) of C is substantially equal to that of H.

The hydrocarbon gas introduced used when the recording layer is formed is not limited to methane. Other hydrocarbon, such as ethylene, acetylene, ethane, propane, or styrene, may be used. Even if any of these is used, the amount of C introduced into the recording layer hardly changes.

The recording layer 12 is of the "phase transformation type". Namely, when a light beam is radiated on the recording layer 12, the atomic arrangement of that portion of the recording layer 12, on which the beam is radiated, is changed so that data is recorded in this portion. Further, the atomic arrangement is changed once again by the beam radiation, so that the data is erased. The portion where data is recorded has an disordered atomic arrangement, i.e., the amorphous state. On the other hand, the portion which is initialized or does not record the data has the crystal state.

When the recording layer 12 is formed, if the Q value increases, the C content in the recording layer increases and the light absorptance decreases. Thus, if the Q value increases excessively, the power of laser beam at the time of recording/erasing considerably increases. As a result, the recording layer could not be practically used.

On the other hand, if the C content is too small, the environmental resistance of the recording layer lowers. Considering these problems, the Q value is set to fall within the range of $5 \leq Q \leq 35$.

The Ge content in the sputtering target, i.e., the Ge content in the metallic composition of the recording layer 12 is set to 5 to 25 at.%, in consideration of the fact that the Ge content higher than this value deteriorates the environmental resistance.

Figure 5:
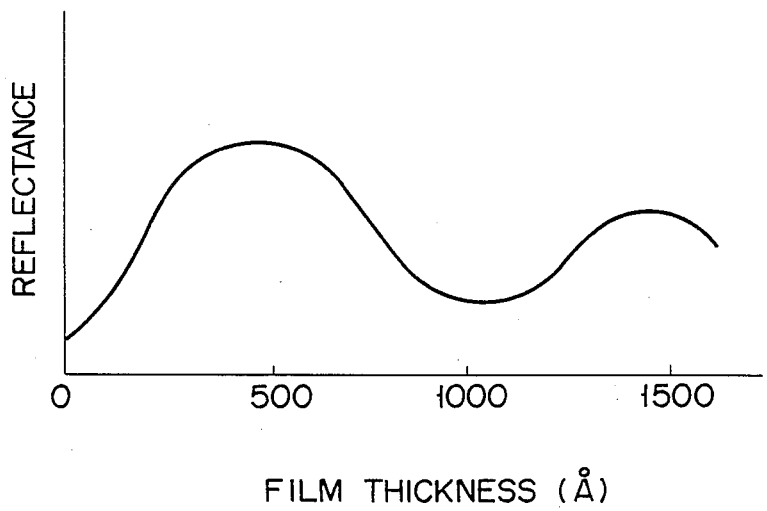
FIG. 5 is a graph showing a relationship between the thickness of the recording layer and the reflectance thereof.

As shown in FIG. 5, when thickness of the recording layer, having the above composition, is 1000 Å, the reflectance takes a minimum value due to a multiple interference effect. If the phase transformation is caused in this state, the reflectance increases remarkably.

According to the information storage medium of the present invention, data is reproduced by utilizing a reflectance difference between a region where the phase transforms and a region where the phase does not transform. It is advantageous that the reflectance difference is large between those portions of the recording layer, which have such thicknesses as to exhibit extreme interference values. The multiple interference effect decreases as the thickness of the recording layer increases, so that a constant reflectance is obtained. On the other hand, as the thickness of the recording layer increases, a laser beam of large power is required. Considering these points, the thickness of the recording layer is desirably set to 5000 Å or less, and most desirably between 300 Å to 1000 Å.

An example of a process of manufacturing the recording layer will now be described. This process is performed, for example, by using a sputtering apparatus shown in FIG. 3. According to this apparatus, an alloy having a composition represented by $Ge_xTe_{100-x}$ (where $5 \leq x \leq 20$) is used as a sputtering target, and the target is subjected to sputtering in an atmosphere containing a hydrocarbon. Exhaust ports 26 and 27 are formed in a bottom portion of a vacuum vessel 17. The exhaust ports 26 and 27 are connected to a rotary pump 18 and a cryopump 19. Gas in the vessel 17 is exhausted by the pumps 18 and 19. Gas introducing ports are formed in the side wall of the vessel 17. These ports are connected to an Ar gas line 20. a $CH_4$ gas line 21 and an $N_2$ gas line 22. The gas lines 20, 21, and 22 are connected to an Ar gas source, a $CH_4$ gas source and an $N_2$ gas source (not shown).

A support member 23 is provided in an upper part of the vacuum vessel 17. A substrate 11 is suspended from the support member 23 in a substantially horizontal manner. The substrate 11, while being supported by the support member 23, is rotated by a rotating apparatus (not shown).

A sputtering target 24 formed of the above-mentioned $Ge_xTe_{100-x}$ is arranged in a bottom region of the vessel 17, so as to face the support member 23. The sputtering target 24 is connected to a power source (not shown). A monitoring device 25 is disposed above the sputtering target 24. A shutter 28, which is freely openable/closable, is arranged just above the sputtering target 24.

A process of forming a recording layer by using this apparatus will now be described. First, gas in the vacuum vessel 17 is exhausted by the rotary pump 18 so that the pressure in the vessel 17 may be reduced, for example, to 0.2 Torr. Then, the gas in the vessel 17 is further exhausted by the cryopump 19 so that the pressure is decreased to $1 \times 10^{-5}$ Torr.

Ar gas and CH₄ gas are supplied, from the Ar gas source and CH₄ gas source, through the Ar gas line 20 and CH₄ gas line 21, into the vacuum vessel 17 at such a flow rate as to establish the relationship of $5 \leq Q \leq 35$. Thus, the pressure in the vessel 17 is kept at a predetermined value, e.g., $5 \times 10^{-3}$ Torr.

Thereafter, the substrate 11 mounted on the support member 23 is rotated at a predetermined speed, e.g., 60 rpm, while the shutter 28 is closed. In this state, the sputtering target 24 is supplied with a predetermined voltage, thus performing a preliminary sputtering step. After it is confirmed that a sputtering discharge occurs in a stable condition, the shutter 28 is opened. Consequently a plasma is caused between the sputtering target 24 and the substrate 11, and the sputtering is let to last for a predetermined time period. By the sputtering, a recording layer of a predetermined thickness is formed on the substrate 11. During the sputtering, the amount of material sputtered from the sputtering target 24. and the voltage applied to the sputtering target 24 is controlled so that the monitored amount may take a predetermined value.

The recording layer 12 thus formed contains Te, Ge, C and H.

When the dielectric protective layer is formed adjacent to the recording layer 12, such a protective layer can be formed by the above-described sputtering apparatus. In this case, only Ar gas is used as the sputtering gas and a sputtering target is formed of a material of the protective layer.

The organic protective layer can be formed, for example, by a spin coat process.

In the information storage medium having the above structure, the recording layer as deposited has the amorphous state in which the atomic arrangement is disordered. Thus, in order to form an information recording portion (hereinafter called record mark) in the amorphous layer, it is necessary to set this layer in the crystal state. For this purpose, a laser beam is radiated on the entire surface of the recording layer, thereby crystallizing the entire recording layer.

When data is recorded, a laser beam of a high power and a short pulse is radiated on the recording layer. The recording layer is heated and quickly cooled, and the radiated part is used as an amorphous record mark.

When the recorded data is erased, a laser beam having a lower power and a longer pulse than the beam for recording is radiated on the record mark portion. This portion is heated and gradually cooled, so that the the record mark portion is set to the crystal state.

When the data is reproduced, a laser beam having a much lower power than the recording/erasing beams is radiated on the recording layer in which the data has been stored. The difference in optical characteristic (reflectance or transmissivity) between the amorphous record mark portion and the crystalline non-recorded portion is detected, thus reproducing the data.

EXPERIMENTS

Various experiments conducted on the information storage medium of the present invention will now be described.

EXPERIMENT 1

A recording film was formed by sputtering. An alloy having a diameter of 5 inches and having a composition of $Ge_{15}T_{85}$ was mounted as a sputtering target in the vacuum vessel 17 shown in FIG. 3. Gas in the vessel 17 was exhausted so that the pressure in the vessel 17 was reduced to $1 \times 10^{-6}$ Torr. Ar gas 10 SCCM and hydrocarbon gas 10 SCCM were introduced into the vessel 17, thus setting the pressure in the vessel 17 to $5 \times 10^{-3}$ Torr. A disc-shaped polycarbonate substrate having an outer diameter of 130 mm and a thickness of 1.2 mm, which was completely rinsed, was used as the substrate 11. The substrate was rotated at a speed of 60 rpm, and the sputtering amount was monitored by the monitor. Based on the monitored amount, the electric power supplied to the target was controlled. The recording film was deposited until the thickness thereof becomes 250 Å, thus forming a recording layer.

Further, by using SiO₂ as a target, only Ar gas was introduced into the vessel 17 at a flow rate of 10 SCCM. Thus, a protection layer of SiO₂ was formed on the recording layer.

The information storage medium thus formed was used in a recording/reproducing apparatus. The information storage medium was rotated at a speed of 1800 rpm, and a laser beam having a recording frequency of 3.7 MHz and a recording pulse width of 50 msec was radiated on the information storage medium. At a linear velocity of 5.5 m/sec and with a recording power of 7 mW, 30 dB C/N was obtained.

EXPERIMENT 2

A change of atomic arrangement of a recording film, which is caused by beam radiation, was confirmed.

A pulse beam having a power of 5 mW, pulse width of 15 μs and a beam diameter of 1 μm was radiated on the recording layer obtained in Experiment 1. As a result, the reflectance of the portion on which the pulse beam was radiated was changed (non-recorded section). Then, a pulse beam having a power of 13 mW and pulse width 300 ns was radiated on this section. It was confirmed that the reflectance of this portion was restored to the initial value (recorded section). The crystalline conditions of the non-recorded portion and the recorded portion were compared by observing diffraction patterns thereof with use of a transmission type electronic microscope. A protective layer was peeled off from a sample, and the diffraction pattern thereof was observed. A halo pattern peculiar to amorphous structure was confirmed in the section on which no laser was radiated. In the non-recorded portion of the section on which the laser was radiated, a diffraction ring and a spot indicative of a crystalline structure were observed. In the recorded portion, a halo pattern peculiar to amorphous structure was confirmed similar to that of the section on which no laser was radiated.

EXPERIMENT 3

A change in reflectance with the passage of time was measured, and the stability of the recorded state was evaluated.

Three types of sputtering gases having the mixing ratios Q of hydrocarbon of 0%, 5% and 35% were prepared. With use of each type of sputtering gas, the recording layer was exposed in an atmosphere of 90% RH at a temperature of 65° C. for 1000 hours. The ratio (Rt/Ri) of the reflectance changing with time (Rt) to the initial reflectance (Ri) was plotted in relation to the exposure time (FIG. 6).

As shown in FIG. 6, when Q=0 (no C is contained in the recording layer), the reflectance started to lower after about 10 hours, and the degree of lowering was very large. In contrast, it was confirmed that, if Q=5 or more, the reflectance was not substantially lowered even after 1000 hours.

What is claimed is:

1. An information storage medium comprising:
   a substrate; and
   a phase-transformation type recording layer formed on the substrate, the recording layer containing Te, Ge, C and H,
   wherein the recording layer is formed by a sputtering process with a Ge-Te alloy used as a target and with a mixed gas of a rare gas and a hydrocarbon gas used as a sputtering gas, the composition of the target being $Ge_xTe_{100-x}$ (where x is expressed by atomic %, and $5 \leq x \leq 20$), the hydrocarbon content in the sputtering gas falling within a range of 5 to 35%.

2. The information storage medium according to claim 1, wherein the recording layer has a thickness of 5000 Å or less.

3. The information storage medium according to claim 2, wherein said recording layer has a thickness of 300 to 1000 Å.

4. The information storage medium according to claim 1, wherein an outer dielectric protection layer is provided on the recording layer.

5. The information storage medium according to claim 1, wherein an organic protection layer is provided on the recording layer.

6. The information storage medium according to claim 1, wherein an inner dielectric protection layer is interposed between the substrate and the recording layer.

7. The information storage medium according to claim 4, wherein an inner dielectric protection layer is interposed between the substrate and the recording layer.

8. The information storage medium according to claim 7, wherein an organic protection layer is provided on the outer dielectric protection layer.

9. A method of manufacturing an information storage medium comprising the steps of:
   introducing a substrate and a target of $Ge_xTe_{100-x}$ (where x is expressed by atomic % and falls within a range of $5 \leq x \leq 20$) into a vessel,
   introducing a mixture of hydrocarbon gas and rare gas into the vessel, the content of the hydrocarbon gas falling within a range of 5 to 35%, and
   sputtering the target to form a phase-transformation type recording layer containing Te, Ge, C and H on the substrate.

10. A medium according to claim 1, wherein the content of C+H of the recording layer falls within a range of 5 at% $\leq C+H \leq 25$ at%.

* * * * *

UNITED STATES PATENT AND TRADEMARK OFFICE
CERTIFICATE OF CORRECTION

PATENT NO. : 4,985,349

DATED : January 15, 1991

INVENTOR(S) : Hideki Ohkawa, et. al.

It is certified that error appears in the above-identified patent and that said Letters Patent is hereby corrected as shown below:

On the Title page, item [75], the first inventor's name should read --Hideki Ohkawa--.

Signed and Sealed this

Twenty-ninth Day of December, 1992

Attest:

DOUGLAS B. COMER

*Attesting Officer*     Acting Commissioner of Patents and Trademarks